United States Patent
Ikekawa (10) Patent No.: US 6,320,908 B1
(45) Date of Patent: Nov. 20, 2001

(54) MOVING PICTURES DECOMPRESSION DEVICE AND METHOD WITH REDUCED PROCESS SPEED OF DECODING SOFTWARE

(75) Inventor: Masao Ikekawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/285,043

(22) Filed: Apr. 1, 1999

(30) Foreign Application Priority Data

Apr. 1, 1998 (JP) .................................................. 10-088570

(51) Int. Cl.$^7$ ...................................................... H04N 7/12
(52) U.S. Cl. .................................. 375/240.25; 375/240.12
(58) Field of Search ........................ 375/240.12, 240.13, 375/240.15, 240.27, 240.25, 240.14, 240.16; 348/415.1, 416.1, 400.1, 402.1, 699; 382/236, 238; 386/111; 712/207, 213

(56) References Cited

U.S. PATENT DOCUMENTS

| | | | |
|---|---|---|---|
| 5,329,318 | * 7/1994 | Keith ..................................... | 348/699 |
| 5,467,131 | * 11/1995 | Bhaskaran et al. ................... | 348/384 |
| 5,696,985 | * 12/1997 | Crump et al. .......................... | 712/36 |
| 5,761,423 | * 6/1998 | Lee ....................................... | 709/215 |
| 5,778,143 | * 7/1998 | Boyce .................................. | 386/111 |
| 5,917,478 | 6/1999 | Ohki ..................................... | 345/186 |
| 5,990,958 | * 11/1999 | Bheda et al. .......................... | 348/407 |
| 6,052,149 | * 4/2000 | Barnaby ............................... | 348/396 |
| 6,072,543 | * 6/2000 | Kim ..................................... | 348/725 |
| 6,154,831 | * 11/2000 | Thayer et al. ....................... | 712/208 |
| 6,167,089 | * 12/2000 | Boyce et al. ................. | 375/240.15 |
| 6,173,366 | * 1/2001 | Thayer et al. ....................... | 711/129 |

FOREIGN PATENT DOCUMENTS 9-312857   12/1997   (JP) .

OTHER PUBLICATIONS

Zucker et al., "Improving performance for software MPEG players", Comcon 96, IEEE, Feb. 1996, pp. 327–332.*
Lee, R.B., "Realtime MPEG video via software decompression on a PA–RISC processor", Compcon 95, IEEE, Mar. 1995, pp. 186–192.*
Torii, Sunao, et al., "Programming Model and Evaluation of Ordered–multithreading Architecture", Information Processing Society of Japan Association, vol. 38, No. 9, Sep. 1997, pp. 1706–1716.
"MPEG: A Video Compression Standard for Multimedia Applications", Communications of the ACM, Apr. 1991, vol. 34, No. 4, pp. 47–58.

* cited by examiner

*Primary Examiner*—Vu Le
(74) *Attorney, Agent, or Firm*—Foley & Lardner

(57) ABSTRACT

A moving pictures decompression device comprises a transmission means for transmitting a macro block to the display device before a motion compensation process in a decompression process of a certain target frame of I-picture or P-picture, the transmitted macro block belonging to I-picture or P-picture just before the target flame, the transmitted macro block also positioned at the same place as the macro block in the target frame. The device comprises another transmission means, responsive to a decompression process of B-picture, transmits a decompressed macro block to the display device after a motion compensation process. The device also comprises a repetition means, responsive to a decompression process of a certain target frame of P-picture or I-picture, transmits to the display device a predetermined number of macro blocks belonging to I-picture or P-picture just before the target frame, executes thereafter a decompression process on the same number of macro blocks in the target frame, and repeats such procedure until the decompression process is implemented over the whole macro blocks. Thus in the application of the device, it is possible to reduce a processing speed of decoding software.

10 Claims, 5 Drawing Sheets

FIG. 1
PRIOR ART

FIG. 2A
PRIOR ART
ORIGINAL ORDER

FIG. 2B
PRIOR ART
COMPRESSION OR DECOMPRESSION ORDER

FIG. 2C
PRIOR ART
DISPLAY ORDER

MOVING PICTURES DECOMPRESSION DEVICE AND METHOD WITH REDUCED PROCESS SPEED OF DECODING SOFTWARE

BACKGROUND OF THE INVENTION

The present invention relates to moving pictures decompression device and method for decompressing compressed moving picture data, and in particular, the invention relates to such moving pictures decompression device and method capable of effectively accessing to memory in case when the data is to be processed by software.

DESCRIPTION OF THE RELATED ART

Regarding a system for compressing and decompressing data in case when high-quality moving picture data is to be stored or used in communication, there is an internationally standardized system called MPEG (moving picture coding experts group). In order to execute a real-time decompression of moving picture data, which is compressed on the basis of the MPEG standard, an enormous amount of computation would be required. Therefore, it has been typical that dedicated designed hardware for this purpose is used. However, as microprocessors have become highly efficient these days, such data compression or decompression is expected to become possible only with an application of software to the ordinary microprocessor without using special hardware.

Algorithm for data compression and decompression in the MPEG, for example, is described in "Communications of the ACM", (Vol. 34, No. 4, April 1991). In rough definition, the decompression algorithm of the MPEG contains a decoding process of variable length codes, an inverse quantization process, an inverse discrete cosine transformation process, and a motion compensation process. Among those processes, the motion compensation process is a kind of process which uses temporal redundancy of the moving picture, and thus restores a picture by cutting off a part of a picture from a picture frame being previously decompressed. The position where the part of picture is cut off from is determined by a parameter called a motion vector. The picture which is to be cut off and restored is a square range called macro block which contains 16 by 16 pixels. A value for each pixel is defined as 8 bit.

Figure 1:
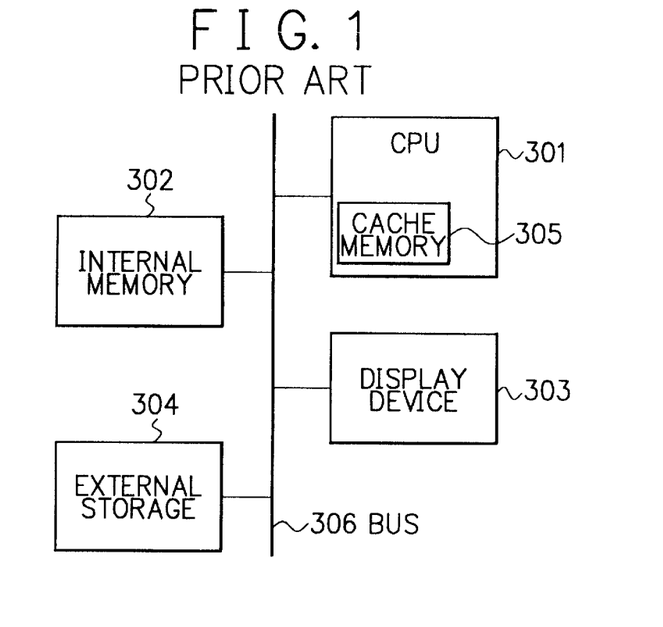
FIG. 1 is a block diagram showing a conventional moving pictures decompression device.

As to a conventional moving pictures decompression device, the one shown in FIG. 1 is known. The moving pictures decompression device comprises a CPU 301, an internal memory 302, a display device 303, an external storage 304, and a cache memory 305. A bit stream compressed by the MPEG is to be stored in the external storage 304. Then the bit stream is read out from the external storage 304, and temporarily stored in the internal memory 302. The bit stream stored in the internal memory 302 is decompressed by an operation of decoding software which operates on the CPU 301, and as a result, picture data is stored in the internal memory 302. The picture data being stored in the internal memory 302 is transformed into a display format by the software on the CPU 301 to be transmitted to the display device 303.

Figure 2A:
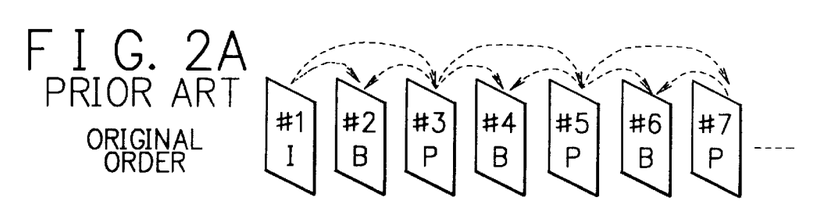
FIG. 2A is a diagram for explaining processing order of frames in a moving picture decompressing process.
Figure 2B:
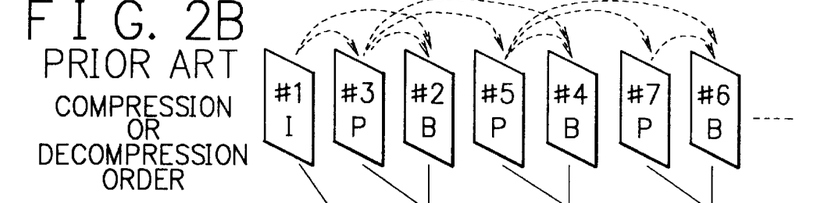
FIG. 2B is another diagram for explaining processing order of frames in a moving picture decompressing process.
Figure 2C:
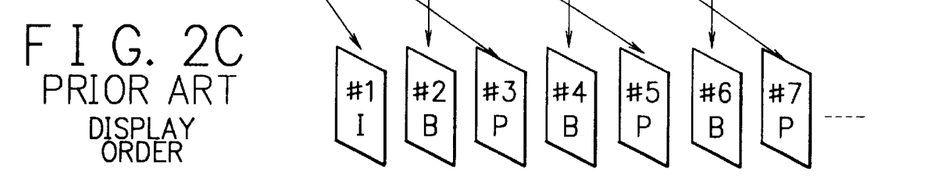
FIG. 2C is still another diagram for explaining processing order of frames in a moving picture decompressing process.

FIG. 2A, FIG. 2B and FIG. 2C are a set of diagrams showing an order of picture frames when conducting compression and decompression by the MPEG. For encoding a picture of a certain frame, the MPEG uses three kinds of pictures, i.e. I-picture, P-picture, and B-picture. I-picture can be defined as a picture which executes compression without the execution of a motion compensation but only with a use of information within the frame. P-picture can be defined as a picture which executes a motion compensation process by forecasting on the basis of picture information of a frame in the past. B-picture can be defined as a picture which executes a motion compensation process by forecasting on the basis of picture information of both frames before and beyond the frame.

FIG. 2A shows a typical distribution of picture types at a time of compressing a moving picture by the MPEG. Frame #1 is I-picture, which is compressed without referring to other frames. Frame #2 is B-picture, which is compressed by a bidirectional motion forecasting process using frame #1 and frame #3. Frame #3 is P-picture, which is compressed by a motion forecasting process using frame #1. Frame #4 is B-picture, which is compressed by a bidirectional motion forecasting process using frame #3 and frame #5. Frame #5 is P-picture, which is compressed by a motion forecasting process using frame 43. Frame #6 is B-picture, which is compressed by a bidirectional motion forecasting process using frame #5 and frame #7. Frame #7 is P-picture, which is compressed by a motion forecasting process using frame #5. The arrows of broken lines indicate reference directions.

FIG. 2B shows processing order of the frames when conducting compression and decompression on the basis of the picture types as indicated above. In a compression process, first, frame #1 is compressed, and then frame #3 is compressed by referring to a picture of frame #1. Next frame #2 is compressed by referring to pictures of frame #1 and frame #3. Next, frame #5 is compressed by referring to the picture of frame #3. Next, frame #4 is compressed by referring to pictures of frame #3 and frame #5. Next, frame #7 is compressed by referring to the picture of frame #5. Then frame #6 is compressed by referring to pictures of frame #5 and frame #7. On the MPEG bit stream where the compressed pictures are written, information of each frame is written in the order of being compressed. Therefore, the order of the frame information would be different from the arrangement order of the original moving picture frames.

In decompressing the MPEG bit stream which is compressed in the above manner, first, frame #1 is decompressed. Then frame #3 is decompressed by referring to a decompressed picture of frame #1. Then frame #2 is decompressed by referring to decompressed pictures of frame #1 and #3. Then, frame #5 is decompressed by referring to the decompressed picture of frame #3. Then frame #4 is decompressed by referring to decompressed pictures of frame #3 and frame #5. Then frame #7 is decompressed by referring to the decompressed picture of frame #5. Then frame #6 is decompressed by referring to decompressed pictures of frames #5 and #7.

FIG. 2C shows display order of the decompressed pictures. In conducting decompression and display operations using such moving pictures decompression device, it becomes necessary to display the pictures by rearranging the decompressed frames. Therefore, the decompression and display processing will have to be done in the following order. After decompressing frame #1, nothing will be displayed. Then after frame #2 is decompressed, frame #2 is displayed. Then after frame #5 is decompressed, frame #3 is displayed. The further procedure is self evident in the figure.

Figure 3:
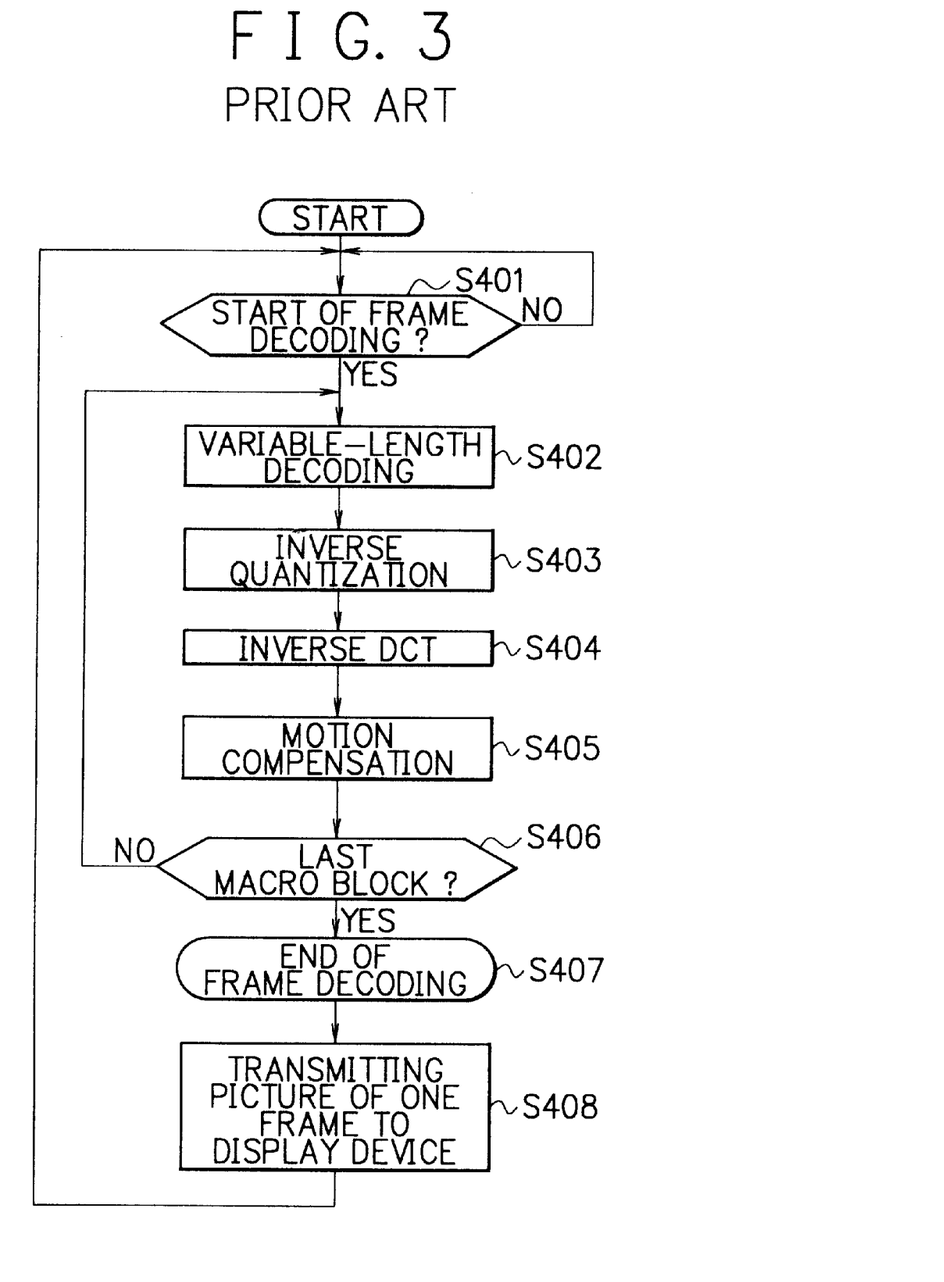
FIG. 3 is a flow chart explaining an operation of the conventional moving pictures decompression device.

An operation of decoding software will be explained with reference to a flow chart in FIG. 3. In a decompression process over a single frame, a start of frame decoding is confirmed (step S401). Variable length code decoding (step S402), inverse quantization (step S403), inverse DCT (step S404), and motion compensation (step S405) are repeated with respect to each macro block. When the last macro block of the frame is being processed (step S406), the decompression process of the frame is over (step S407). After that, picture data of the frame is transmitted to the display device 303 in the above-mentioned order (step S408).

In the CPU 301 of the moving pictures decompression device shown in FIG. 1, the cache memory 305 is built in. Compared to the internal memory 302, the cache memory 305 has a smaller capacity and is capable of faster access. The CPU 301 controls the cache memory 305 such that it stores recently accessed data contents, and discharge the ones which have not been accessed for a long time since last being accessed. The CPU 301 then controls so that the discharged data contents are written back in the internal memory 302. That is, as far as accessing a data content again right after its being accessed, since the data content is still remaining in the cache memory 305, the data content can be accessed within a machine cycle of the CPU 301. This phenomenon is referred to as a cache hit. On the contrary, in case when the CPU 301 is to access a certain data content which has not been accessed before, or a data content in the internal memory 302 which is not stored in the cache memory 305 for not having been accessed for some time since last being accessed, data access will take several times to some ten times over the machine cycle of the CPU. This phenomenon is referred to as a cache miss.

In a common type of microprocessor, the operation of the whole processor stops while waiting the data access due to a cache miss. Consequently, it becomes important that the cache memory is used effectively in order to speed up the processing of the software. Up to this day, a capacity of a microprocessor built-in cache memory is a maximum of some dozen kilo bytes. There are some microprocessors in which a secondary cache memory having a grater capacity than the cache memory 305 is provided outside the CPU 301. At present, a capacity of a secondary cache memory is a maximum of some hundred kilo bytes. On the other hand, it is possible that a capacity of a single picture frame used in the MPEG ranges between some dozen kilo bytes to several megabytes, depending on the screen size. Under the standard of MPEG2 main profile.main level, which is used most versatilely at present, a capacity of one picture frame becomes several hundred kilo bytes. In this case, therefore, the secondary cache memory is only capable of storing one picture frame at most.

Now the operation of the cache memory 305 in conducting decompression with the MPEG2 main profile.main level by a conventional moving pictures decompression device will be explained. For example, a series of movements between decompressing frame #3 and transmitting frame #1 to the display device 303 will be discussed with reference to FIG. 2B. In a motion compensation process among other decompression processes with respect to frame #3, frame #1 is to be referred to, and thus two-frame portion of picture has to be accessed to correspond with the picture of frame #3 which is being decompressed. Since the cache memory 305 is incapable of storing two-frame portion of picture, at the point where the decompression process of the frame #3 is completed, only a portion of each frame #3 and frame #1 is stored in the cache memory 305. In the MPEG decompression algorithm, moving picture data is processed downward from left to right of the screen. Therefore, the frames to be referred to in many cases are also accessed from top to bottom. Accordingly, as the decompression process proceeds, the data in the upper part of the screen is discharged from the cache memory 305, eventually leaving only the data in the lower part of the screen inside the cache memory 305. Then, in transmitting frame #1 to the display device 303, the picture data of frame #1 is to be successively accessed from the top of the screen. However, while trying to access the data in the upper part of frame #1, the cache memory 305 only has the data of the lower part. Therefore, the whole access attempts will end up as cache misses.

Now a series of movements between decompressing frame #2 and transmitting frame #2 to the display device 303 will be discussed with reference to FIG. 2B. In a motion compensation process among other decompression processes with respect to frame #2, frames #1 and #3 are to be referred to, and thus three-frame portion of picture has to be accessed. At the beginning of the decompression process over frame #2, only the data of the lower part of frame #1 is remaining in the cache memory 305, as described above. However, since each picture of frames #1, #2, #3 is accessed from top to bottom, the whole access attempts in the decompression process will end up as cache misses. At the point when the decompression process of frame #2 is over, only the data in the lower part of each of the frames #1, #2, and #3 is remaining in the cache memory 305. Then the picture data of frame #3 is to be accessed from the top, though the whole access attempts in this case also end up as cache misses as in the case of transmitting frame #1 to the display device 303.

In this way, regarding the conventional type of moving pictures decompression device, the decompressed frames are rearranged to be displayed. Therefore, the decompressed picture data is once stored in the internal memory 302, and when a particular frame comes to its turn of being displayed, the frame is transmitted to the display device 303 from the internal memory 302 through the CPU 301. Accordingly, in the conventional moving pictures decompression device, cache misses occur frequently in the motion compensation process as well as transmission process directed to the display device, resulting in slowing down the processing speed of the software.

SUMMARY OF THE INVENTION

It is therefore an object of the present invention to provide moving pictures decompression device and method which are capable of controlling cache misses in the motion compensation process as well as transmission process directed to the display device, so as to prevent the processing speed of the decoding software from slowing down.

In accordance with a first aspect of the present invention, there is provided a moving pictures decompression device having a CPU, a memory device, a display device, and decoding software, comprising: a transmission means for transmitting a macro block to the display device before a motion compensation process in a decompression process of a certain target frame of I-picture or P-picture, the transmitted macro block belonging to I-picture or P-picture just before the target frame, the transmitted macro block also positioned at the same place as the macro block in the target frame being under the decompression process.

In accordance with a second aspect of the present invention there is provided a moving pictures decompression device having a CPU, a memory device, a display device, and decoding software, comprising: a transmission means, responsive to a decompression process of B-picture, transmitting a decompressed macro block to the display device after a motion compensation process.

In accordance with a third aspect of the present invention there is provided a moving pictures decompression device having a CPU, a memory device, a display device, and decoding software comprising: a first transmission means for transmitting a macro block to the display device before a motion compensation process in a decompression process of a certain target frame of I-picture or P-picture, the transmitted macro block belonging to I-picture or P-picture just before the target frame, the transmitted macro block also positioned at the same place as the macro block in the target frame under the decompression process; and a second transmission means, responsive to a decompression process of B-picture, transmitting a decompressed macro block to the display device after a motion compensation process.

In accordance with a fourth aspect of the present invention, there is provided a moving pictures decompression device having a CPU, a memory device, a display device, and decoding software, comprising: a repetition means, responsive to a decompression process of a certain target frame of P-picture or I-picture, transmitting to the display device a predetermined number of macro blocks belonging to I-picture or P-picture just before the target frame, executing thereafter a decompression process on the same number of macro blocks in the target frame, and repeating such procedure until the decompression process is implemented over the whole macro blocks.

In accordance with a fifth aspect of the present invention, there is provided a moving pictures decompression device having a CPU, a memory device, a display device, and decoding software, comprising: a repetition means, responsive to a decompression process of a certain target frame of P-picture or I-picture, transmitting to the display device a predetermined number of macro blocks belonging to I-picture or P-picture just before the target frame, executing thereafter a decompression process on the same number of macro blocks in the target frame, and repeating such procedure until the decompression process is implemented over the whole macro blocks: and a transmission means, responsive to a decompression process of B-picture, transmitting a decompressed macro block to the display device after a motion compensation process.

In accordance with a sixth aspect of the present invention, there is provided a moving pictures decompression method using a CPU, a memory device, a display device, and decoding software, comprising: a transmission step for transmitting a macro block to the display device before a motion compensation process in a decompression process of a certain target frame of I-picture or P-picture, the transmitted macro block belonging to I-picture or P-picture just before the target frame, the transmitted macro block also positioned at the same place as the macro block in the target frame being under the decompression process.

In accordance with a seventh aspect of the present invention, there is provided a moving pictures decompression method using a CPU, a memory device, display device, and decoding software, comprising: a transmission step, responsive to a decompression process of B-picture, transmitting a decompressed macro block to the display device after a motion compensation process.

In accordance with an eighth aspect of the present invention, there is provided a moving pictures decompression method using a CPU, a memory device, a display device, and decoding software comprising: a first transmission step for transmitting a macro block to the display device before a motion compensation process in a decompression process of a certain target frame of I-picture or P-picture, the transmitted macro block belonging to I-picture or P-picture just before the target frame, the transmitted macro block also positioned at the same place as the macro block in the target frame under the decompression process; and a second transmission step, responsive to a decompression process of B-picture, transmitting a decompressed macro block to the display device after a motion compensation process.

In accordance with a ninth aspect of the present invention, there is provided a moving pictures decompression method using a CPU, a memory device, a display device, and decoding software, comprising: a repetition step, responsive to a decompression process of a certain target frame of P-picture or I-picture, transmitting to the display device a predetermined number of macro blocks belonging to I-picture or P-picture just before the target frame, executing thereafter a decompression process on the same number of macro blocks in the target frame, and repeating such procedure until the decompression process is implemented over the whole macro blocks.

In accordance with a tenth aspect of the present invention, there is provided a moving pictures decompression method using a CPU, a memory device, a display device, and decoding software, comprising: a repetition step, responsive to a decompression process of a certain target frame of P-picture or I-picture, transmitting to the display device a predetermined number of macro blocks belonging to I-picture or P-picture just before the target frame, executing thereafter a decompression process on the same number of macro blocks in the target frame, and repeating such procedure until the decompression process is implemented over the whole macro blocks: and a transmission step, responsive to a decompression process of B-picture, transmitting a decompressed macro block to the display device after a motion compensation process.

BRIEF DESCRIPTION OF THE DRAWINGS

The above and further objects and the novel feature of the invention will more fully appear from the following detailed description when the same is read in connection with the accompanying drawings, in which.

DESCRIPTION OF THE PREFERRED EMBODIMENTS

Referring now to the drawings, a detail description of preferred embodiments of the present invention will be described.

Figure 4:
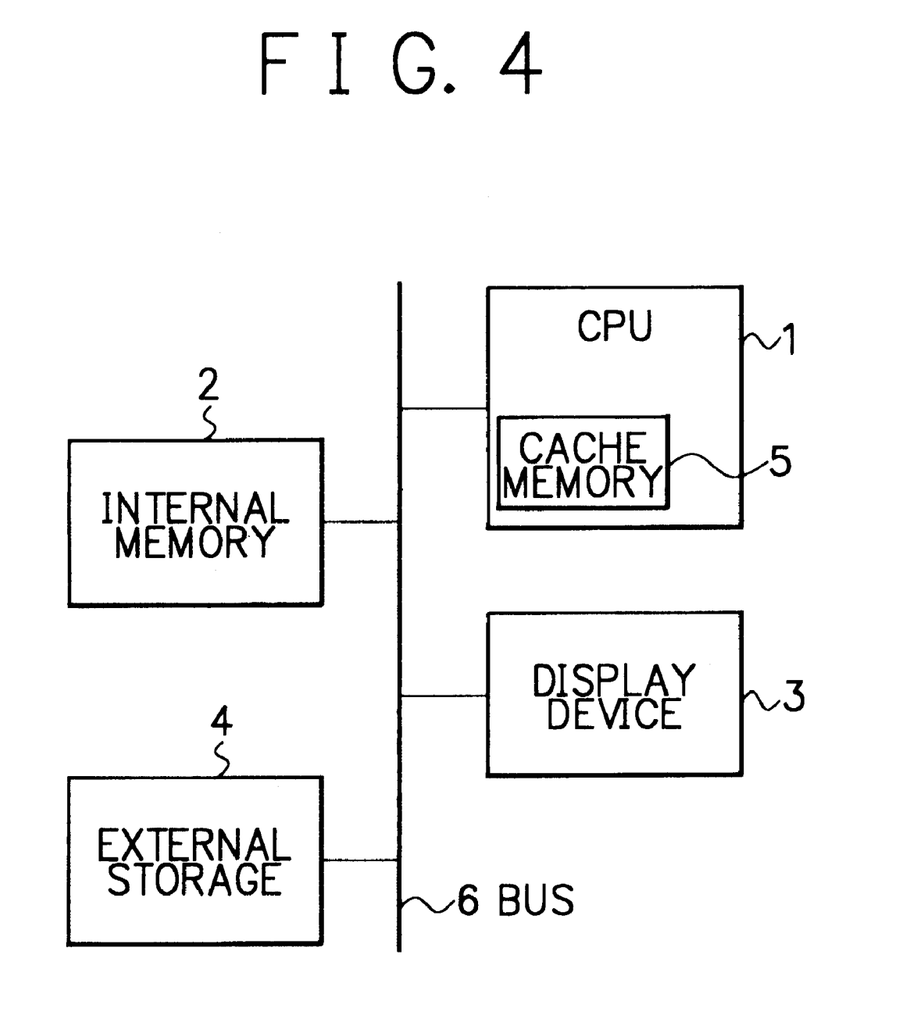
FIG. 4 is a block diagram showing a moving pictures decompression device of first and second embodiments of the present invention.

FIG. 4 is a diagram showing a moving pictures decompression device as a first embodiment of the present invention. The moving pictures decompression device comprises a CPU 1, an internal memory 2, a display device 3, an external storage 4, and a cache memory 5. The CPU 1 is connected to the internal memory 2, the display device 3 and the external storage 4 through a bus 6. The CPU 1 includes a cache memory 5 and stores decoding software.

The bit stream being compressed by the MPEG is stored in the external storage 4. Then the bit stream is read out from the external storage 4 and stored temporary in the internal memory 2. The bit stream in the internal memory 2 is decompressed by the operation of the decoding software which is operating on the CPU1. As a result, picture data is stored in the internal memory 2 in accordance with a type of picture of the frame being decompressed, or transformed into a display format so as to be transmitted to the display device 3. When the picture data stored in the internal memory 2 has its frame come under its turn of being displayed, the picture data is transformed into a display format by the software on the CPU 1, so as to be transmitted to the display device.

Figure 5:
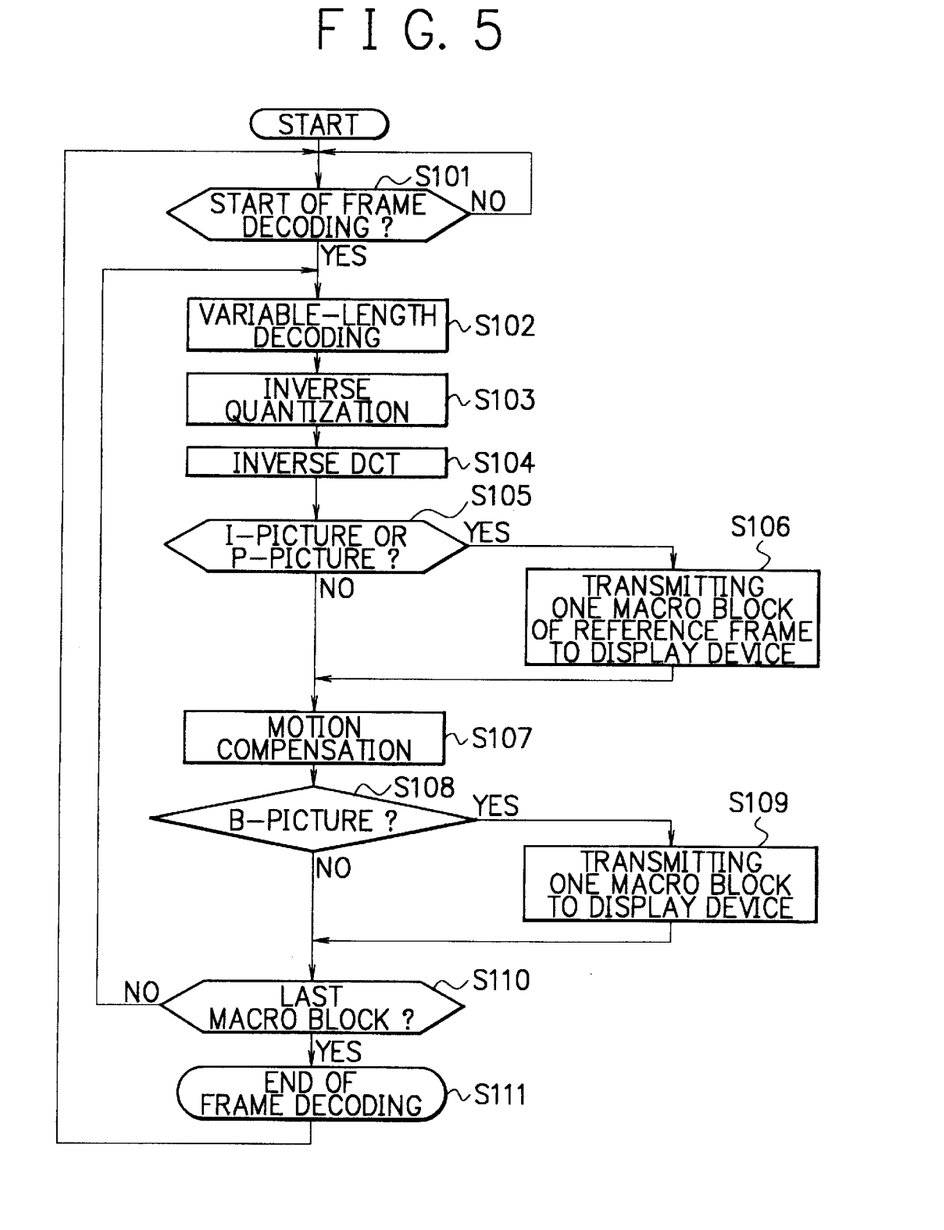
FIG. 5 is a flow chart explaining an operation of the moving pictures decompression device of the first embodiment of the present invention.

Next the operation of the moving pictures decompression device of the first embodiment of the present invention will be described with reference to FIG. 4 and FIG. 5. FIG. 5 is a flow chart showing the operation of the moving pictures decompression device of the first embodiment of the present invention.

In starting a decompression operation of frame #1, the CPU 1 first determines whether frame decoding is to start or not (step S101). When it is confirmed at step S101 that the frame decoding is to start, then the CPU 1 will execute variable length code decoding (step S102), inverse quantization (step S103), and inverse DCT (step S104), with respect to each macro block. Then the CPU 1 is to determine whether the frame being decompressed at present is I-picture or P-picture (step S105). When it is determined at step S105 that the decompressed frame is I-picture or P-picture, a single macro block of I-picture or P-picture (reference frame) just before the target frame is transmitted to the display device 3 (step S106). After this, a motion compensation is conducted (step S107). Furthermore, when it is determined that the decompressed frame is not either I-picture or P-picture, motion compensation is conducted at step S107.

Next, the CPU 1 is to determine whether the decompressing frame is B-picture or not (step S108). When it is determined that the decompressing frame is B-picture at step S108, the decompressed macro block is transmitted to the display device 3 (step S109), after which the CPU 1 is to determine whether the macro block is the last one of the frame (step S110). On the other hand, when it is determined that the decompressing frame is not B-picture, the process goes on to step S110. Then at step S110, in case when the transmitted macro block is not the last one of the frame, frame decoding will be terminated, and the operation goes back to step S101 (step S111).

In the application of the moving pictures decompression device of the first embodiment, a macro block of a frame which is referred to just before conducting a motion compensation process of a macro block in the decompression process of P-picture, being in the same position as the macro block of P-picture, is transmitted to the display device 3. Consequently, the data of the macro block would be stored in the cache memory 5. In this way, it is possible to reduce the possibilities of cache misses in the motion compensation process.

Next, a moving pictures decompression device of a second embodiment of the present invention will be described with reference to FIG. 4 and FIG. 6. As shown in FIG. 4, the moving pictures decompression device of the second embodiment of the invention also comprises a CPU 1, an internal memory 2, a display device 3, an external storage 4, and a cache memory 5. The CPU 1 is connected to the internal memory 2, the display device 3, the external storage 4, respectively, through a bus 6. The CPU 1 contains the cache memory 5 inside, and stores decoding software.

Figure 6:
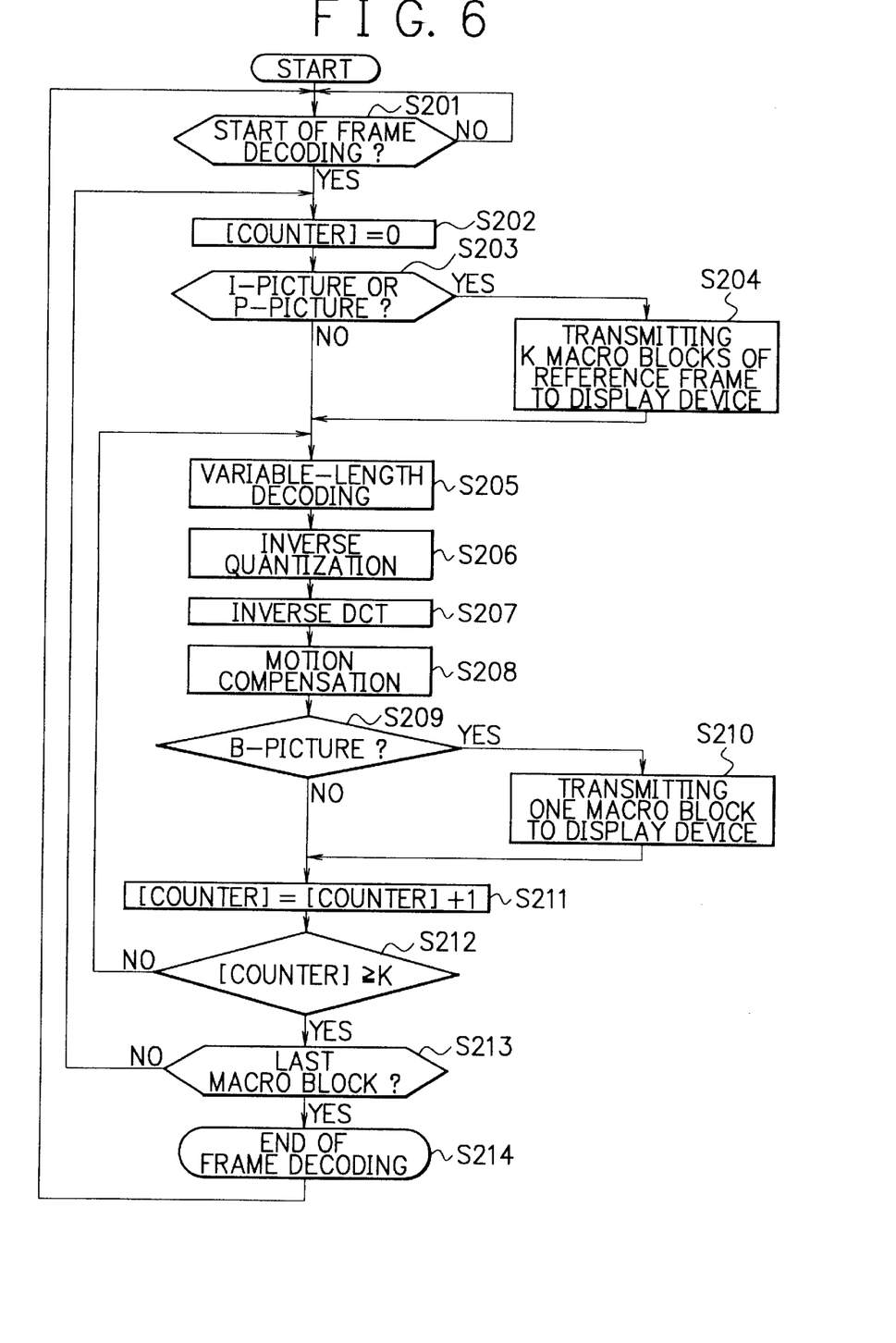
FIG. 6 is a flow chart explaining an operation of the moving pictures decompression device of the second embodiment of the present invention.

FIG. 6 is a flow chart showing an operation of the moving pictures decompression device of the second embodiment of the present invention. In the process of decompressing a single frame, the CPU 1 is to determine whether frame decoding is to start or not (step S201). When it is confirmed at step S201 that frame decoding is to start, then the CPU 1 sets the counter to [counter]=0 (step S202), and determines whether the presently decompressed frame is I-picture or P-picture (step S203). At step S203, when it is confirmed that the frame being decompressed at present is I-picture or P-picture, K macro blocks of I-picture or P-picture (reference frame) just before the decompressed frame are transmitted to the display device 3 (step S204). After the process at step S204, or in case when the frame being decompressed at present is neither I-picture nor P-picture, the CPU 1 conducts variable length code decoding (step S205), inverse quantization (step S206), inverse DCT (step S207) and motion compensation (step S208).

Then the CPU 1 will determine whether the frame being decompressed at the moment is B-picture (step S209). When it is confirmed at step S209 that the frame under decompression is B-picture, a particular single decompressed macro block thereof is transmitted to the display device 3 (step S201), and the counter is set to [counter]=[counter]+1 (step S211). When it is determined at step S209 that the decompressing frame is not B-picture, the process proceeds to step S211.

Next, it is to be determined whether it is [counter]≧K (step S212). When the counter is not [counter]≧K, the process goes back to step S205. In step S212, when the counter is [counter]≧K, it is to be determined whether the macro block is the last one in the frame (step S213). When it is determined that the macro block is not the last one of the frame, the process goes back to step S202. On the other hand, when it is determined at step S213 that the macro block is the last one of the frame, frame decoding is terminated (step S214), and the process goes back to step S201.

In this situation, the most appropriate value for the constant K differs depending on the size of the cache memory 5 and the size of a picture to be decompressed. For instance, in case of using a moving pictures decompression device including the cache memory of a 256 kilo-byte capacity to decompress a picture of MPEG2 main profile-.main level, having 720 (horizontal)×480 (vertical) pixels, K should be 45 which is a number of macro blocks in a single horizontal row on the screen.

The moving pictures decompression device in the second embodiment is effective in case when the cache memory 5 arranged inside the CPU 1 has a capacity of some hundred kilo bytes. In the application of the moving pictures decompression device of the second embodiment, before conducting the decompression process of a predetermined number of macro blocks in decompressing P-picture, the same predetermined number of macro blocks in the reference frame, being at the same position as those in the preceding P-picture, are transmitted to the display device 3. Consequently, the data of such macro blocks would be stored in the cache memory 5. In this way, it is possible to reduce the possibilities of cache misses in the motion compensation process. With respect to the macro block under decompression, a close macro block within the reference frame is stored in the cache memory 5, and therefore, as long as the movement is small, it is possible to execute the motion compensation process without inducing any cache misses.

In the application of the moving pictures decompression device of the second embodiment, in decompressing B-picture, the macro blocks which have completed the motion compensation process would not be stored in the internal memory 2 but would be transmitted to the display device 3. Therefore, there is no need for reaccess to picture data in the internal memory 2, and thus it is possible to reduce cache misses in the process of transmission toward the display device 3.

In conclusion, it is clear that the present invention has the following effects.

In accordance with the present invention, just before conducting a motion compensation process on a single macro block or a predetermined number of macro blocks in P-picture in the P-picture decompression process, a single macro block or a predetermined number of macro blocks in the reference frame at the same position as the target macro blocks are transmitted to the display device 3. Therefore, the target macro block data is stored in the cache memory 5. In this way, it is possible to reduce the possibilities of cache misses in the motion compensation process. This effect is based on the situation with typical moving pictures having some parts with less motion,(e.g. scenery), where the area in the reference frame which is in the same position or close to the position of those parts with less motion are frequently used in the motion compensation process.

Furthermore, in accordance with the present invention, in decompressing B-picture, the macro blocks which have completed the motion compensation process would not be stored in the internal memory 2 but would be transmitted to the display device 3. As a result, there would be no need for reaccess to picture data in the internal memory 2, and thus it is possible to reduce cache misses in the process of transmission toward the display device 3.

While the preferred embodiments of the invention have been described using specific terms, such description is for illustrative purposes only, and it is to be understood that changes and variations may be made without departing from the spirit or the scope of the following claims.

What is claimed is:

1. A moving pictures decompression device having a CPU, a memory device, a display device, and decoding software, comprising:
    a transmission means for transmitting a macro block to the display device after beginning a decompression process of a certain target frame and before a motion compensation process in the decompression process of the certain target frame of I-picture or P-picture, the transmitted macro block belonging to I-picture or P-picture just before the target frame, the transmitted macro block also positioned at the same place as the macro block in the target frame being under the decompression process.

2. A moving pictures decompression device having a CPU, a memory device, a display device, and decoding software, comprising:
    a transmission means, responsive to a decompression process of B-picture for a given frame decoding, transmitting a decompressed macro block to the display device after a motion compensation process and prior to the end of frame decoding for that given frame decoding.

3. A moving pictures decompression device having a CPU, a memory device, a display device, and decoding software, comprising:
    a first transmission means for transmitting a macro block to the display device after beginning a decompression process of a certain target frame and before a motion compensation process in the decompression process of the certain target frame of I-picture or P-picture, the transmitted macro block belonging to I-picture or P-picture just before the target frame, the transmitted macro block also positioned at the same place as the macro block in the target frame under the decompression process; and
    a second transmission means, responsive to a decompression process of B-picture, transmitting a decompressed macro block to the display device after a motion compensation process.

4. A moving pictures decompression device having a CPU, a memory device, a display device, and decoding software, comprising:
    a repetition means, responsive to a decompression process of a certain target frame of P-picture or I-picture, transmitting to the display device a predetermined number of macro blocks belonging to I-picture or P-picture just before the target frame, executing thereafter a decompression process on the same number of macro blocks in the target frame, and repeating such procedure until the decompression process is implemented over the whole macro blocks.

5. A moving pictures decompression device having a CPU, a memory device, a display device, and decoding software, comprising:
    a repetition means, responsive to a decompression process of a certain target frame of P-picture or I-picture, transmitting to the display device a predetermined number of macro blocks belonging to I-picture or P-picture just before the target frame, executing thereafter a decompression process on the same number of macro blocks in the target frame, and repeating such procedure until the decompression process is implemented over the whole macro blocks: and
    a transmission means, responsive to a decompression process of B-picture, transmitting a decompressed macro block to the display device after a motion compensation process.

6. A moving pictures decompression method using a CPU, a memory device, a display device, and decoding software, comprising:
    a transmission step for transmitting a macro block to the display device after beginning a decompression process of a certain target frame and before a motion compensation process in the decompression process of the certain target frame of I-picture or P-picture, the transmitted macro block belonging to I-picture or P-picture just before the target frame, the transmitted macro block also positioned at the same place as the macro block in the target frame under the decompression process.

7. A moving pictures decompression method using a CPU, a memory device, a display device, and decoding software, comprising:
    a transmission step, responsive to a decompression process of B-picture for a given frame decoding, transmitting a decompressed macro block to the display device after a motion compensation process and prior to the end of frame decoding for that given frame decoding.

8. A moving pictures decompression method using a CPU, a memory device, a display device, and decoding software, comprising:

a first transmission step for transmitting a macro block to the display device after beginning a decompression process of a certain target frame and before a motion compensation process in the decompression process of the certain target frame of I-picture or P-picture, the transmitted macro block belonging to I-picture or P-picture just before the target frame, the transmitted macro block also positioned at the same place as the macro block in the target frame under the decompression process; and a second transmission means, responsive to a decompression process of B-picture, transmitting a decompressed macro block to the display device after a motion compensation process.

9. A moving pictures decompression method using a CPU, a memory device, a display device, and decoding software, comprising:

a repetition step, responsive to a decompression process of a certain target frame of P-picture or I-picture, transmitting to the display device a predetermined number of macro blocks belonging to I-picture or P-picture just before the target frame, executing thereafter a decompression process on the same number of macro blocks in the target frame, and repeating such procedure until the decompression process is implemented over the whole macro blocks.

10. A moving pictures decompression method using a CPU, a memory device, a display device, and decoding software, comprising:

a repetition step, responsive to a decompression process of a certain target frame of P-picture or I-picture, transmitting to the display device a predetermined number of macro blocks belonging to I-picture or P-picture just before the target frame, executing thereafter a decompression process on the same number of macro blocks in the target frame, and repeating such procedure until the decompression process is implemented over the whole macro blocks: and a transmission step, responsive to a decompression process of B-picture, transmitting a decompressed macro block to the display device after a motion compensation process.

* * * * *